United States Patent [19]

DiPaola

[11] Patent Number: 5,040,740
[45] Date of Patent: Aug. 20, 1991

[54] DUAL SAFETY BELT RETRACTOR WITH SINGLE SWITCH ASSEMBLY

[75] Inventor: Donald A. DiPaola, Mount Clemens, Mich.

[73] Assignee: Allied-Signal Inc., Morris Township, Morris County, N.J.

[21] Appl. No.: 532,043

[22] Filed: May 30, 1990

[51] Int. Cl.$^5$ .................... B65H 75/48; H01H 3/16; B60R 22/36
[52] U.S. Cl. .................... 242/107.40 R; 200/61.58 B; 280/806
[58] Field of Search ......... 242/107, 107.4 R, 107.4 A; 280/806, 807; 200/61.58 B, 85 A, 332

[56] References Cited

U.S. PATENT DOCUMENTS

| | | | |
|---|---|---|---|
| 3,670,119 | 6/1972 | Gebhardt et al. | 200/85 A |
| 3,863,209 | 1/1975 | Hollins | 200/61.58 B X |
| 3,880,380 | 4/1975 | Sugiura et al. | 242/107.4 R |
| 4,268,816 | 5/1981 | Matsuoka et al. | 200/61.58 B X |
| 4,424,509 | 1/1984 | Andres et al. | 200/61.58 B X |
| 4,571,471 | 2/1986 | Haglund | 200/61.58 B |

FOREIGN PATENT DOCUMENTS 2701186 7/1978 Fed. Rep. of Germany ... 200/61.58 B

Primary Examiner—Daniel P. Stodola
Assistant Examiner—John P. Darling

[57] ABSTRACT

A safety belt system (22) comprising: a dual spool retractor assembly (30) including first and second retractors, each retractor including safety belt webbing (32), a wheel (50), an interlock mechanism (54) for coacting with the wheel (50) to prevent the extension of the webbing, the retractor assembly further includes first and second levers (60a,b, 80a, b) one associated with each retractor, activated by an occupant, to manually release a corresponding interlock mechanism for its corresponding wheel to permit extension of the webbing; a switch assembly (100) mounted to the dual retractor assembly (30) comprising a single electrical switch (106) for generating a signal indicative of the position of the levers (60,80); a carrier (102) mounted to the dual retractor assembly (30) for mounting the switch (106) and for supporting actuation bar (104), the actuation bar (104) rotatingly and slidingly supported within the carrier (102) for selectively enabling and disabling the switch.

28 Claims, 5 Drawing Sheets

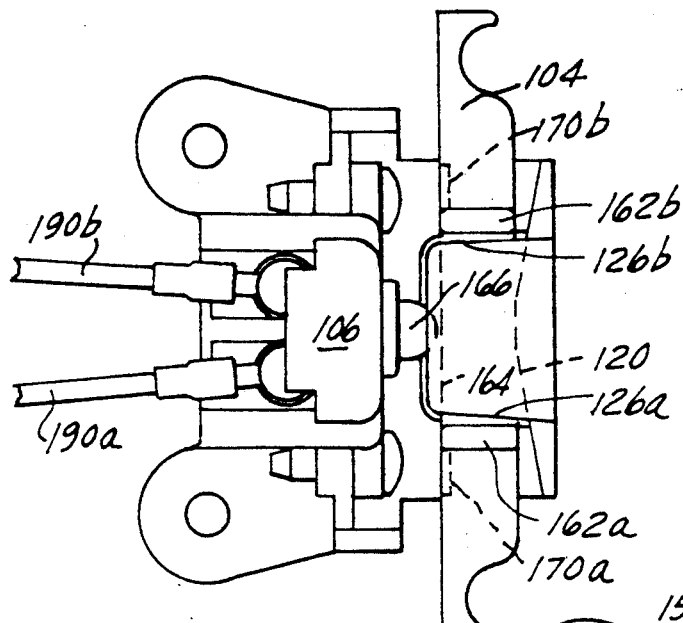
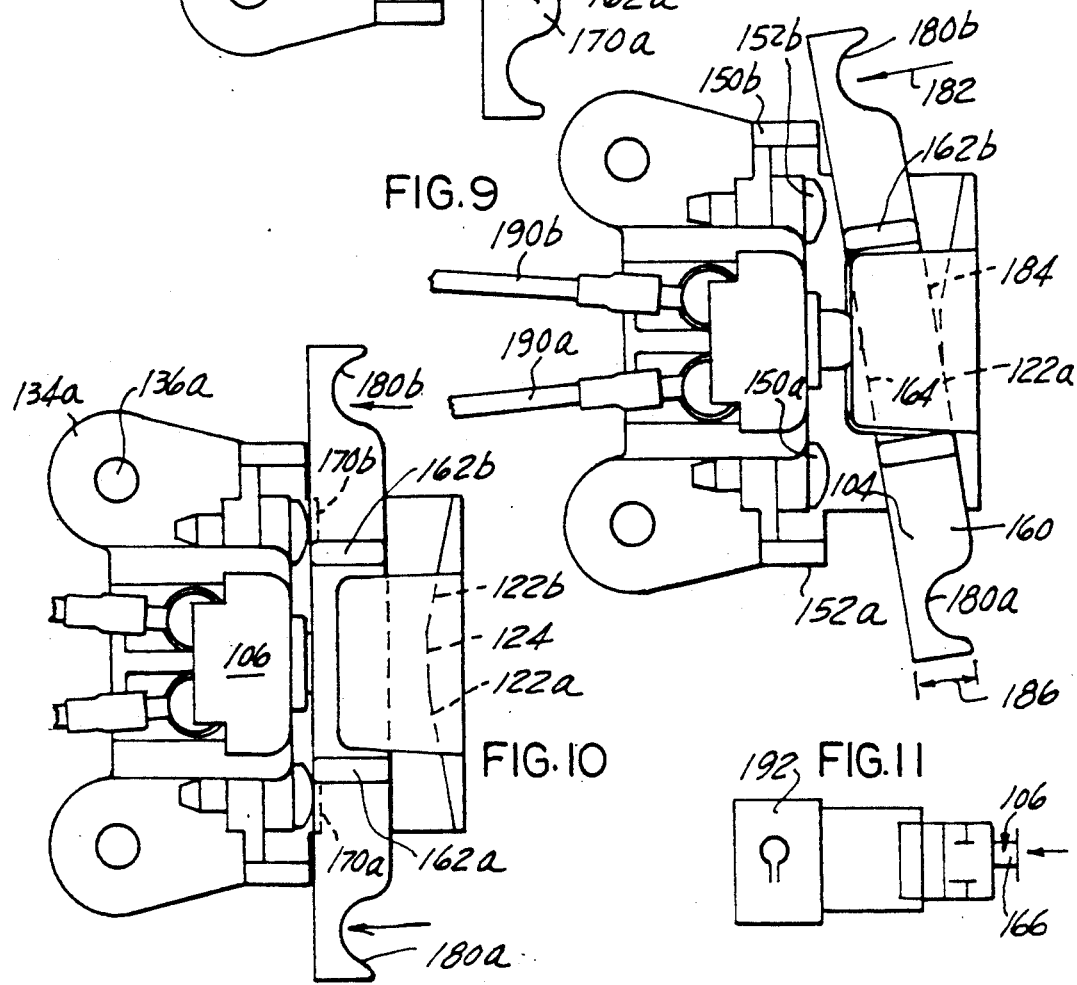
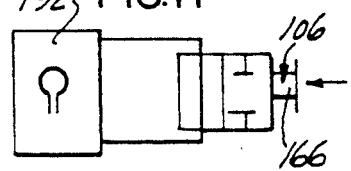

DUAL SAFETY BELT RETRACTOR WITH SINGLE SWITCH ASSEMBLY

BACKGROUND AND SUMMARY OF THE INVENTION

The present invention is generally related to passenger restraints and more particularly to a dual safety belt retractor having a single electrical switch assembly.

The present invention relates to an improvement in a passive, motorized restraint system that employs a dual spool retractor having a plurality of levers. The levers are arranged to provide a means to disengage a locking member from an associated pawl within each of the two retractors of the dual spool retractor. In the preferred embodiment of the invention a single electrical switch assembly is utilized to sense the position of the levers and to generate a signal that is used to provide information to the occupant informing same that the lever or levers is in a release position and that corrective action is required. The present invention improves upon the prior art by utilizing a novel single switch construction as opposed to the plurality of electrical switches previously used to sense individual lever motion.

It is an object of the present invention to provide a single switch assembly capable of sensing the motion of associated lever mechanisms which are part of a dual spool retractor.

Accordingly, the present invention comprises a single switch assembly and improved dual spool retractor individually or as part of a safety belt system. As the invention relates to the safety belt system, such system would comprise: a dual spool retractor assembly including first and second retractors, each retractor including safety belt webbing, a pawl, an interlock mechanism for coacting with the pawl to prevent the extension of the webbing. The retractor assembly further includes lever means including first and second levers, one associated with each retractor, activated by an occupant, to manually release a corresponding interlock mechanism for its corresponding pawl to permit extension of the webbing. The system additionally includes a switch assembly mounted to the dual retractor assembly comprising a single electrical switch for generating a signal indicative of the position of the levers. The switch assembly additionally includes a carrier mounted to the dual retractor assembly for mounting the switch and for supporting actuation bar, wherein the actuation bar is rotatingly and slidingly supported within the carrier for selectively enabling and disabling the switch in response to forces imparted thereto by the first and second levers. The actuation bar being pivotally positioned and movable to a first position relative to the carrier and switch in response to forces received upon actuation of the first lever, movable to a second position relative to the carrier in response to forces received from the second lever wherein such movement does not cause the switch to change state and movable to a third position in response to forces received upon activating both the first and second levers to change the state of the switch.

Many other objects and purposes of the invention will be clear from the following detailed description of the drawings.

BRIEF DESCRIPTION OF THE DRAWINGS

In the drawings:

FIGS. 8, 9 and 10 illustrate top views of the connector assembly in various operational modes.

FIG. 11 illustrates an electric schematic circuit.

DETAILED DESCRIPTION OF THE DRAWING

Figure 1:
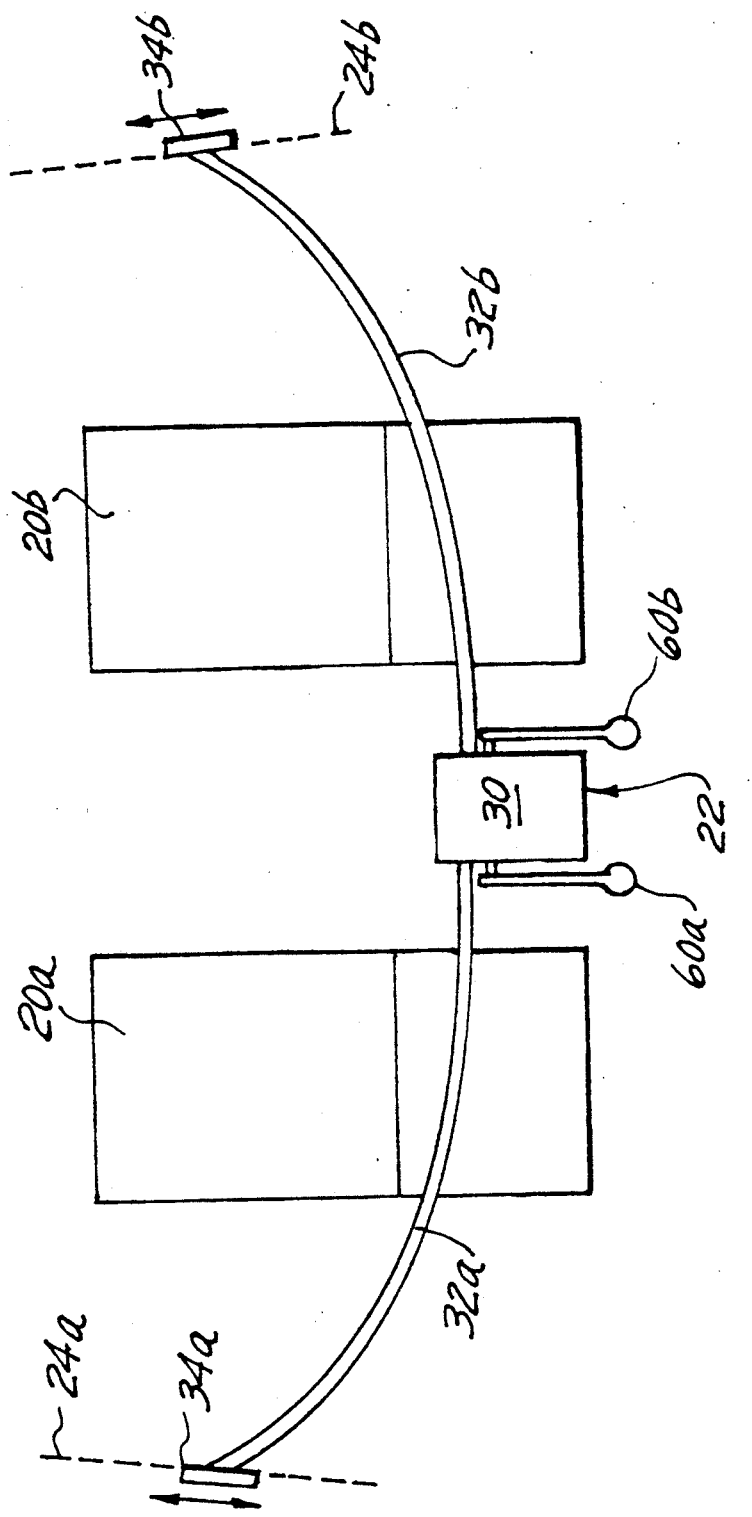
FIG. 1 illustrates a dual spool retractor incorporating the present invention.

With regard to FIG. 1 there is shown the front seats 20a and b of a vehicle equipped with a motorized seat belt system 22. The motorized seat belt system comprises a plurality of tracks 24a and b typically installed within the roof or door, as is known in the art. Positioned between the seats 20a and b is a dual spool safety belt retractor generally shown as 30. Extending from the dual retractor 30 is safety belt webbing 32a and b attached to corresponding slides 34a and b which move within the tracks 24. Electric motors and cables are typically used to move the slides forwardly and rearwardly relative to the seats in a known manner and are not discussed herein. In the exemplary system 22 shown in FIG. 1, the webbing 32 is permanently attached to its corresponding slide 34. During operation, when the ignition switch is turned on, the motor drives the respective slides 34 rearwardly (as shown in FIG. 1) to envelope the occupant. Safety belt tension is maintained by return springs situated within the dual retractor 30. When the ignition is turned off the motor moves the slides forwardly (down in FIG. 1) to permit the occupant to exit the vehicle.

Figure 2:
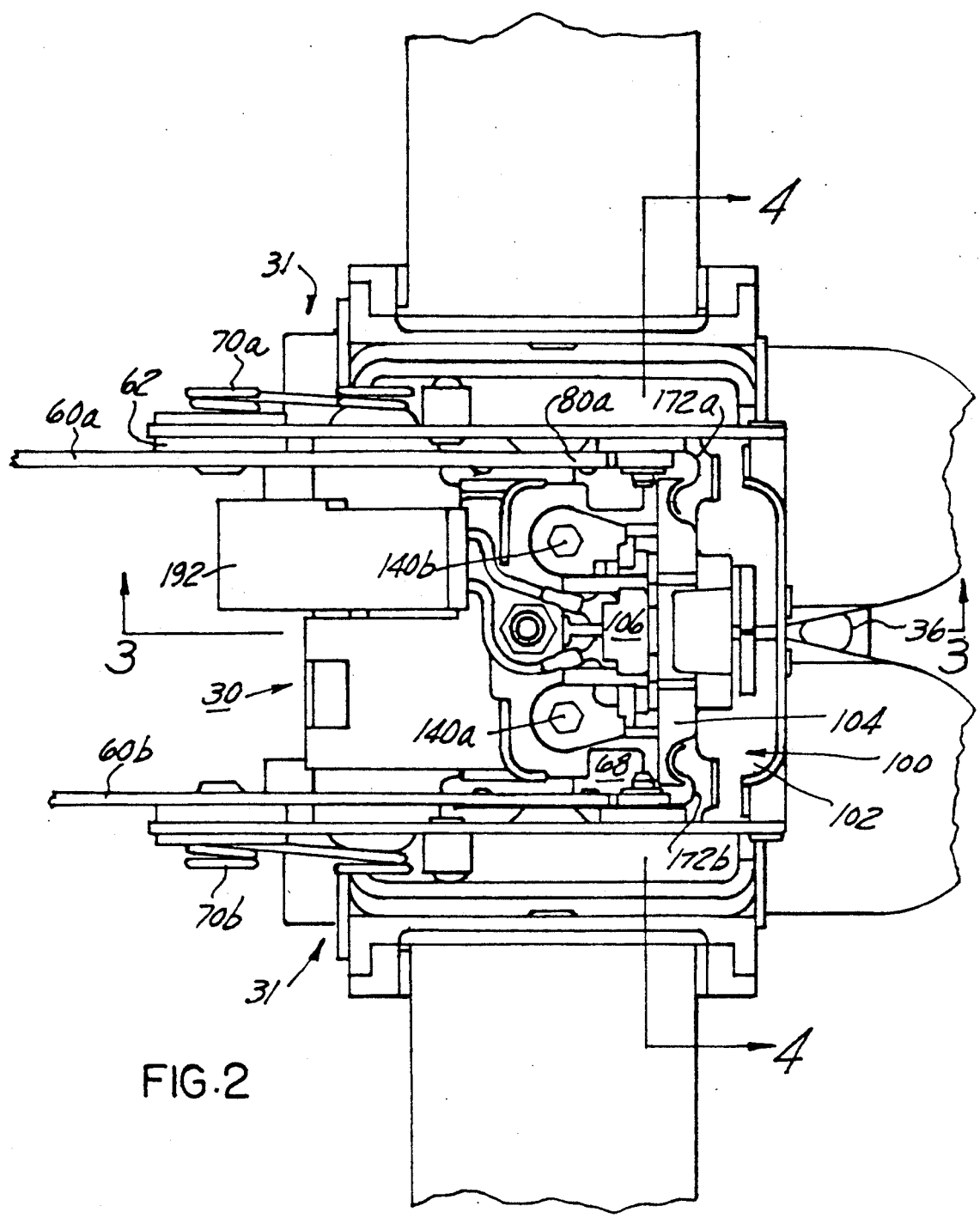
FIG. 2 is a top view of a dual spool retractor.
Figure 3:
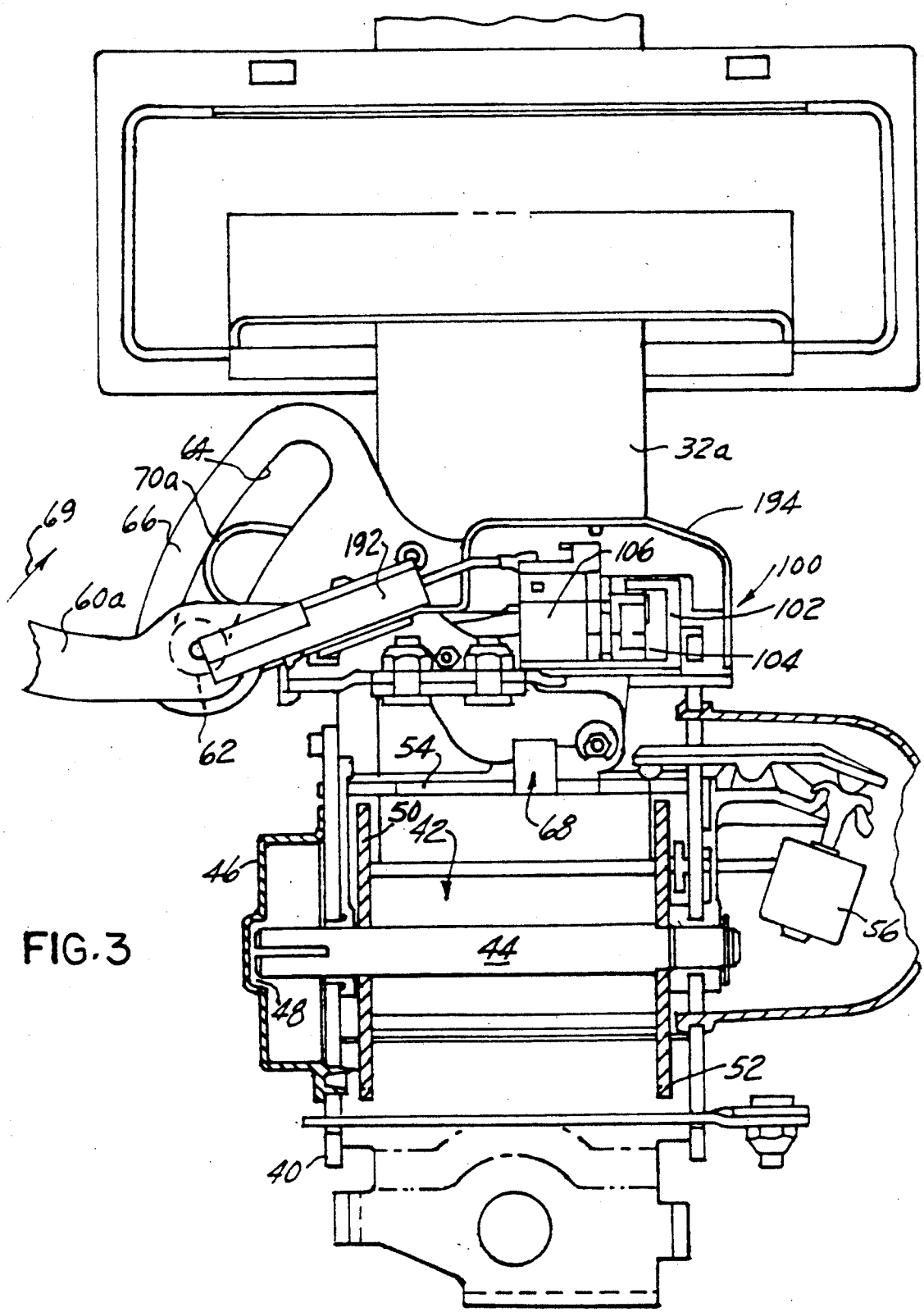
FIG. 3 is a side cross-sectional view of one of the retractors comprising the dual spool retractor.
Figure 4:
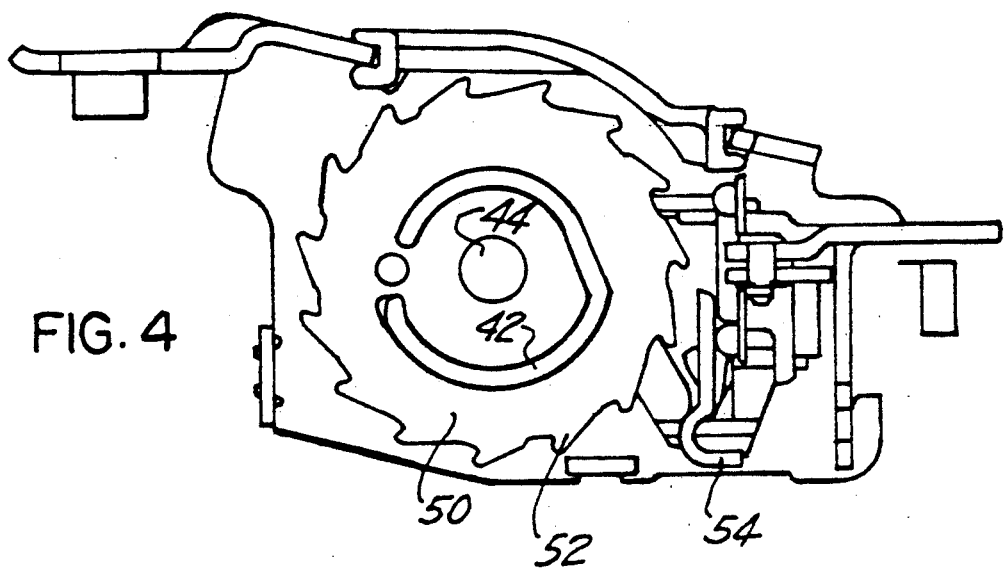
FIG. 4 is a cross-sectional view showing a pawl mechanism of one of the retractors.

FIGS. 2, 3 and 4 illustrate the major components of the known dual spool retractor 30 as well as the improvement offered by the present invention. The retractor 30 is symetrical about its centerline 36 and as such, only one retractor portion 31 of the dual spool retractor 30 will be discussed. The retractor 30 (or 31) comprises a housing 40 adapted to rotationally support a spool 42 and shaft 44. Wound about the shaft 44 is the safety belt webbing such as 32a. A return spring (not shown) is fitted within a spring housing 46 and to the slotted end 48 of the shaft 44 to return bias the spool 42 and webbing 32. Attached, in a known manner to the shaft 44 is a wheel 50 (see FIG. 4). Movable relative to the teeth 52 of the wheel 50 is a locking member 54. The locking member is moved in a known manner by a pendulum 56 (see FIG. 3) during high deceleration or crash conditions, such that the locking member is moved into physical engagement with the teeth 52 preventing extension of the webbing during these situations. After the high deceleration condition has terminated, the pendulum moves to its normal or rest position permitting the locking member 54 to disengage from the wheel 50. In this situation the webbing is free to be extended as the occupant moves about the passenger compartment. As know in the art, the above described retractor is referred to as a vehicle sensitive retractor. The present invention will operate with a wide variety of retractor types such as: web sensitive retractor, dual mode retractor, etc.

As mentioned above, the system 22 shown in FIG. 1 envisions that the webbing 32 is permanently attached to the slide 34 thereby making it extremely difficult for an occupant to purposefully circumvent the protective features of the system 22. Because of this permanent attachment if for some reason the slide 34 is prohibited from moving and if the wheel 50 is prohibited from rotating due to interaction with the locking member 54, a means is provided to manually release the wheel 50 thereby insuring that the occupant can manually extend the webbing 32 prior to exiting the vehicle. This manual release mechanism has previously been incorporated within dual spool retractors such as 30 and includes, for each spool such as 42, a hinged lever 60a or b (see FIGS. 1,2 and 3). Each lever such as 60a includes a cam 62 (see FIG. 2) movable within a slot 64, formed within a bracket 66 attached to the housing 40. One end of the lever 60a includes a release member 68 is positioned near its corresponding locking member 54 such that when the lever is moved (or rotated) upwardly in the direction shown by arrow 69, the release member 68 moves its corresponding locking member 54 away from the teeth 52 of the wheel 50, thereby permitting the manual extension of the webbing 32. During normal operation each of the levers 60a and b are maintained in a downward or engaged position such as that shown in FIG. 3 and maintained in such position by corresponding over-center springs 70a and b.

As each of the levers 60a or b is rotated up or down a rear portion such as 80a (or 80b) of the lever such as 60a is moved in a rearward and forward manner relative to either seat 20a,b. This motion had previously been used to sensed by individual microswitches positioned proximate the portions 80a and/or b. If during the normal operation of the vehicle the operator has purposely lifted a lever 60 against the restraining force of an over center spring 70, these individual switches generated a warning signal to the operator indicating that a lever or levers 60 is in the upward or release position. The significance of maintaining the lever in its upward position is that the release member 68 has disengaged the locking member 54 from its wheel 50, as such during a high deceleration condition, the webbing 32 is free to extend since the normal locking action of the locking member 54 has been overridden.

Figure 5:
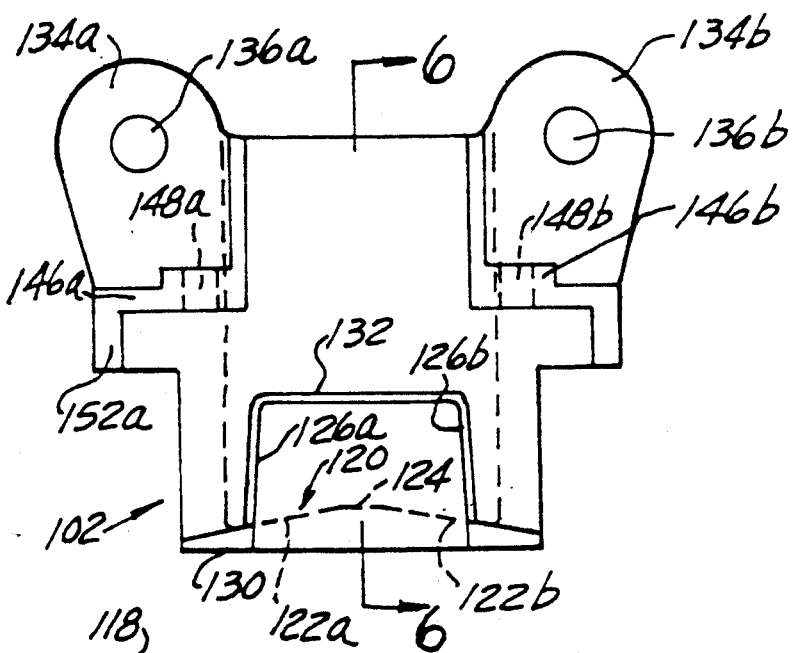
FIGS. 5-7 illustrate various views of a carrier portion of a switch assembly.
Figure 6:
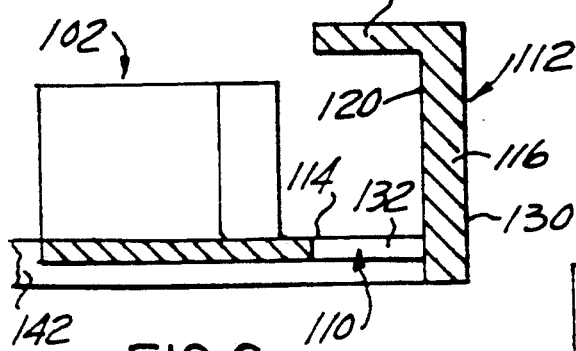
Figure 7:
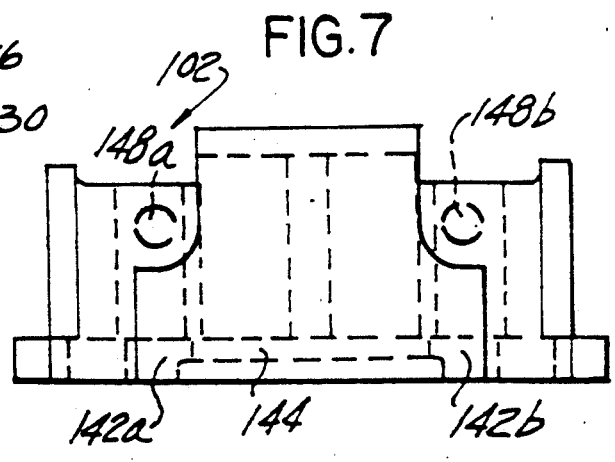

The present invention replaces the separate switches used in the prior art by a single switch assembly generally shown as 100. The switch assembly 100 comprises three major portions, a carrier 102 shown in isolation in FIGS. 5-7, an actuation bar 104 shown in FIGS. 8-10, movably secured relative to the carrier 102, and a switch 106. These components 102, 104 and 106 are also shown in FIGS. 2 and 3.

With regard to FIGS. 5-10, the carrier 102 includes a bottom member 110. Formed at one end of the carrier is a U-shaped assembly 112 comprising a lower surface 114 which is the top surface of the bottom element 110, a vertical element 116 and a top portion 118.

The inner surface 120 of the vertical member 116 is conically shaped having in the preferred embodiment slanted walls 122a and b. The apex 124 may be truncated as shown in the figures. This surface 120 provides a pivot surface about which the actuation bar 104 may rotate. It should be appreciated that the surface 120 need not be formed by flat walls and can also be arcuately shaped. The sides 126a and b of the top member 118 may be tapered inwardly at an angle (such as approximately three degrees) relative to the end surface 130 of the vertical member 116. The bottom 110 further includes a cut-out 132 (visible in FIGS. 5 and 6), the purpose of which is primarily to aid in the molding of the carrier. The carrier 102 additionally includes mounting flanges 134a and b having mounting holes 136a and b, for attaching the carrier 102 to the housing 40 of the dual spool retractor. Fasteners such as screws 140a and b (shown in FIG. 2) may be used to secure the carrier 102 to the retractor 30. The bottom 110, proximate its right and left hand sides 142a and b, is of slightly thicker construction than a middle portion 144. These thicker bottom portions are primarily used to add additional structural integrity to the carrier 102. Opposite the vertical member 116 are a plurality of stepped walls 146a and b. Each wall having an opening 148a and b for receipt of a fastener such as 150a and b, which are used to secure the switch 106 to the carrier 102. The fasteners 150 and switch 106 are also shown in FIGS. 8-10. Portions of each stepped wall 146, such as portions 152a and b, provide a mechanical stop for the actuation bar 104 as discussed below.

The actuation bar 104 has a generally rectangular shape and includes a generally flat top surface 160 and flat lower surface (not shown) permitting the actuation bar 104 to slide upon the surface 114. The actuation bar includes two upraised bosses 162a and b, spaced relative to each other at a distance slightly greater than the distance between the sides 126a and b of the top 118 portion of the carrier 102. The bosses 162 prevent axial motion of the bar 104 and keep same in the carrier 102. The bar 104 includes a generally flat activation surface 164 which is used to depress a plunger element 166 of the switch 106. The bar need not be made of solid construction throughout and may include various cut-outs or fillets to reduce material utilization. The bar may include a plurality of recesses such as 170a and b to permit entry of the fasteners 150 when the actuation bar is moved to its actuation position shown in FIG. 10, fully depressing the plunger 166.

Reference is again made to FIG. 2 and particularly to the levers 60a or b. Attached to the rear portions 80a or b of the levers is an arcuately shaped latching members such as switch actuators 172a or b. It should be apparent that as each lever is rotated upwardly and downwardly, the rear portions 80 and switch actuators 172 move in a generally rear to forward manner. FIG. 2 illustrates the levers 60 in a down position. With the latching members or switch actuators 172 moved forward to engage the actuation bar 104 causing same to depress the plunger 166 of the switch 102. This activated orientation has been replicated in FIG. 10. The actuation bar 104 further includes a plurality of recesses 180a and b adapted to receive a portion of its switch actuator. As shown more specifically in FIG. 2, the each end of the switch actuator is in contact with the recesses 180. In the preferred embodiment of the invention, the switch actuators 172a and b are fabricated of resilient spring steel. This shape also compensates for any stack-up of tolerances in the assembly/manufacturing process.

With regard to FIG. 8, when both levers 60 are rotated upwardly, the switch actuators 172 are correspondingly moved rearwardly releasing the actuation bar 104. The spring loaded plunger 166 urges the actuation bar rearwardly toward the inner pivot surface 120 of the carrier 102. In this situation the switch 106 generates a signal to a warning device such as light 192 (see FIG. 11) identifying to the occupant or occupants of the vehicle that the levers 60 are in their release position thereby informing the occupant to move the levers 60 to their downward, normal or latched positions to permit the retractor 30 to function. FIG. 9 illustrates the situation wherein one lever such as 60a has been moved to its downward position while the other lever 60b is still in its upward position. The force imparted to the actuation bar 104 by its switch actuator 172a is shown by the arrow 182. As mentioned above, the present invention has replaced the two separate switches previously utilized in this type of arrangement. As such, the switch 106 must generate a warning signal when both or only one lever is in its up or release position. In the embodiment illustrated, the switch 106 is closed when either lever is up and open when both levers are down. With the lever 60a in its latched or down position, the switch actuator 172a moves the actuation bar 104 from the condition shown in FIG. 8 to the condition shown in FIG. 9. As the end 182 of the actuation bar 104 moves forwardly, its rear surface 184 pivots about the inner pivot surface or wall 120 of the carrier 102 to the position shown in FIG. 9, wherein the rear surface of the bar 104 lies adjacent the sloped surface or wall portion 122a and the end 182 or front surface 164 is in contact with the stop formed by portion 152b of the carrier 102. This rotating action is done essentially without or at least minimal contact with the spring loaded plunger 166 of the switch 106 and as such, the switch 106 remains in a condition even to enable the generation of the warning signal even with one of the two levers (60b) remains in its up or release position. As can be seen from FIG. 9, the thickness 186 of the actuation bar 104 is chosen such that when the rear surface 184 lies on surface 122a, the front surface 164 is in contact with the stop 152b.

Extending from the switch 106 are a plurality of electrical leads 190a and b which are received within a connector assembly 192 shown in FIGS. 2 and 3. The connector assembly 192 is secured to a cover element 194 which attaches to the retractor 30 to protect the switch assembly 100.

Many changes and modifications in the above described embodiment of the invention can, of course, be carried out without departing from the scope thereof. Accordingly, that scope is intended to be limited only by the scope of the appended claims.

I claim:

1. A safety belt system (22) comprising:
   a dual spool retractor assembly (30) including first and second retractors (31), each retractor including safety belt webbing (32), a toothed wheel (50), an interlock mechanism (54) for coacting with the wheel (50) to prevent the extension of the webbing, the retractor assembly (30) further includes lever means including first and second levers (60a,b 80a,b) one associated with each retractor movable between release and engaged positions, for releasing a corresponding interlock mechanism from its wheel to permit extension of the webbing and for causing such interlock mechanism to engage its wheel;
   a switch assembly (100) mounted to the dual retractor assembly (30) comprising single electrical switch means (106) for generating a signal indicative of the position of the lever means (60, 80), the switch means having an enabled and disabled state of operation;
   a carrier (102) mounted to the dual retractor assembly (300) for mounting the switch means (106) and for supporting actuation bar means (104);
   actuation bar means (104) supported within the carrier (1002) and movable in response to forces imparted thereto by one or both first and second levers for selectively enabling and disabling the switch means, such that when both the first and second levers are in their respective engaged positions the switch means (106) is caused to change state;

2. The system as defined in claim 1 wherein the actuation bar means (104) is pivotally positioned relative to the carrier (102) for moving to a first position relative to the carrier (102) and switch means (106) in response to forces received upon actuation of the first lever, for moving to a second position relative to the carrier (102) in response to forces received from the second lever, and for moving to a third position in response to forces received upon activating both the first and second levers to change the state of the switch.

3. The system as defined in claim 2 wherein the carrier (102) includes a vertical member 116 having pivot surface means (120,122,124), oppositely positioned relative to the switch means (106) for providing a surface about which the actuation bar means (104) can rotate in response to a force received from one of the first or second levers (60a, 60b) wherein when the actuation bar means is so rotated the state of the switch means is not changed.

4. The system (22) as defined in claim 3 wherein the carrier (102) includes a top portion (118) extending from the vertical member (116) to entrap the actuation bar means (104) and wherein the actuation bar means (104) comprises an actuation bar (104) including means for preventing same from sliding out of the carrier (102), the actuation bar including o a top surface thereof two spaced bosses (162) extending above the top portion (118) of the carrier (102).

5. The system (22) as defined in claim 4 wherein the bosses (162) are spaced such that the bosses do not impede the rotary motion of the actuation bar (104) such as by interacting with sides (126) of the top portion (118).

6. The system (22) as defined in claim 5 wherein the sides (126) of the top portion are tapered inwardly to prevent interfering with the bosses (162) as the actuation bar means (104) is rotated.

7. The system (22) as defined in claim 3 wherein the pivot surface means (122,124) includes tapered wall portions (122).

8. The system (22) as defined in claim 3 wherein the pivot surface means (122,124) includes flat, tapered wall portions (122) angled inwardly toward the center of the vertical portion (116), including a flat, truncated wall member (124) proximate the center of the vertical portion (116).

9. The system (22) as defined in claim 8 wherein the carrier (102) includes first means (152) for providing a mechanical stop to limit the rotational and translational motion of the actuation bar (104).

10. The system (22) as defined in claim 9 wherein the first means (150) includes first and second stops (152) positioned about the switch means (106) such that when the actuation bar (104) is rotated in one or another direction and in engagement with a portion of the pivot surface means (120, 122, 124), another portion of the actuation bar (104) is in contact with a corresponding one of the first and second stops (152) and wherein in this condition the actuation bar (104) has not engaged the switch means (106) in a manner to cause same to change state.

11. The system as defined in claim 10 wherein each first and second lever (60a,b) includes a switch actuator (172) extending therefrom and movable therewith, each switch actuator engageable with a corresponding portion of the actuation bar means (104) to rotate the actuation bar when acting upon same individually and for translating the actuation bar when acting upon same simultaneously, wherein each switch actuator (172) translates relative to the carrier (102) and actuation bar means (104) as each corresponding first and second lever (60a,b) is moved.

12. The system as defined in claim 11 wherein each switch actuator (172) includes an engagement portion having an arcuately shaped end adapted to be received in a corresponding recess (180a,b) of the actuation bar (104) to move the actuation bar means.

13. The system as defined in claim 12 wherein the engagement portion is resilient.

14. The system as defined in claim 1 including occupant information means (196), responsive to the signal generated by a the switch means (106) for generating an information signal informing the occupant that one or both of the first and second levers (60a,b) is in a position corresponding to release of said interlock mechanism (54).

15. A switch assembly (100) adapted to be mounted to a dual retractor assembly (30) of the type having operable first and second levers (60,80) movable between engaged and release positions, the switch assembly comprising single electrical switch means (106) for generating a signal indicative of the positions of the levers (60,80), the switch means having an enabled and disabled state of operation;
   a carrier (102) adapted to be mounted to the dual retractor assembly (30) for mounting the switch means (106) and for supporting actuation bar means (104); and
   actuation bar means (104) supported within the carrier (102) and movable in response to forces imparted thereto by one or both first and second levers for selectively enabling and disabling the switch means, such that when both the first and second levers are in their respective engaged positions the switch means (106) is caused to change state.

16. The assembly (100) as defined in claim 15 including occupant information means (196), responsive to the signal generated by the switch means (106) for generating an information signal informing the occupant that one or both of the first and second levers (60a,b) is in a position corresponding to the release of its interlock mechanism (54).

17. The assembly (100) as defied in claim 16 wherein the carrier (102) includes a top portion (118) extending from the vertical member (116) to entrap the actuation bar means (104) and wherein the actuation bar means (104) comprises an actuation bar (104) including means for preventing the same from sliding out of the carrier (102) the actuator bar including on a top surface thereof, two spaced bosses (162), extending above the top portion (118) of the carrier (102).

18. The assembly (100) as defined in claim 17 wherein the bosses (162)) are spaced such that the bosses do not impede the rotary motion of the actuation bar (104) such as by interacting with sides (126) of the top portion (118)) as the actuation bar (104) is rotated.

19. The assembly (100) as defined in claim 18 wherein the sides (126) of the top portion are tapered to prevent interfering with the bosses (162) as the actuation bar means (104) is rotated.

20. The assembly (100) as defined in claim 15 wherein the actuation bar means (104) is pivotally positioned relative to the carrier (102) for moving to a first position relative to the carrier (1002) and switch means (106) in response to forces received upon actuation of the first lever, for moving to a second position relative to the carrier (102) in response to forces received from the second lever, and for moving to a third position in response to forces received upon activating both the first and second levers to change the state of the switch.

21. The assembly (100) as defined in claim 20 wherein the carrier (102) includes a vertical member 116 having pivot surface means (120,122,124), oppositely positioned relative to the switch means (106) for providing a surface about which the actuation bar means (104) can rotate in response to a force received from one of the first or second levers (60a, 60b) wherein when the actuation bar means is so rotated the state of the switch means is not changed.

22. The assembly (100) as defined in claim 21 wherein the pivot surface means (122,124) includes tapered wall portions (122).

23. The assembly (100) as defined in claim 21 wherein the pivot surface means (122,124) includes flat, tapered wall portions (122) angled inwardly toward the center of the vertical portion (116), including a flat, truncated wall Portion (124) proximate the center of the vertical member (116).

24. The assembly (100) as defined in claim 23 wherein the carrier (102) includes first means (152) for providing a mechanical stop to limit the rotational and translational motion of the actuation bar (104).

25. The assembly (100) as defined in claim 24 wherein the first means (150) includes first and second stops (152) positioned about the switch means (106) such that when the actuation bar (104) is rotated in one or another direction and in engagement with a portion of the pivot surface means (120, 122, 124), another portion of the actuation bar (104) is in contact with a corresponding one of the first and second stops (152) and wherein in this condition the actuation bar (104) has not engaged the switch means (106) in a manner to cause same to change state.

26. The assembly as defined in claim 25 wherein the each first and second lever (60a,b) includes a switch actuator (172) extending therefrom and movable therewith, each switch actuator engageable with a corresponding portion of the actuation bar means (104) to rotate the actuation bar when acting upon same individually and for translating the actuation bar when acting upon same simultaneously, wherein each switch actuator (172) translates relative to the carrier (102) and actuation bar means (104) as each corresponding first and second lever (60a,b) is moved.

27. The assembly (100) as defined in claim 26 wherein each switch actuator (172) includes an engagement portion having an arcuately shaped end adapted to be received in a corresponding recess (180a,b) of the actuation bar (104) to move the actuation bar means.

28. The assembly as defined in claim 27 wherein the engagement portion is resilient.

* * * * *